March 8, 1960
T. J. SCUITTO
2,927,735
FREQUENCY-CONTROL SYSTEM
Filed Sept. 19, 1956
5 Sheets-Sheet 1
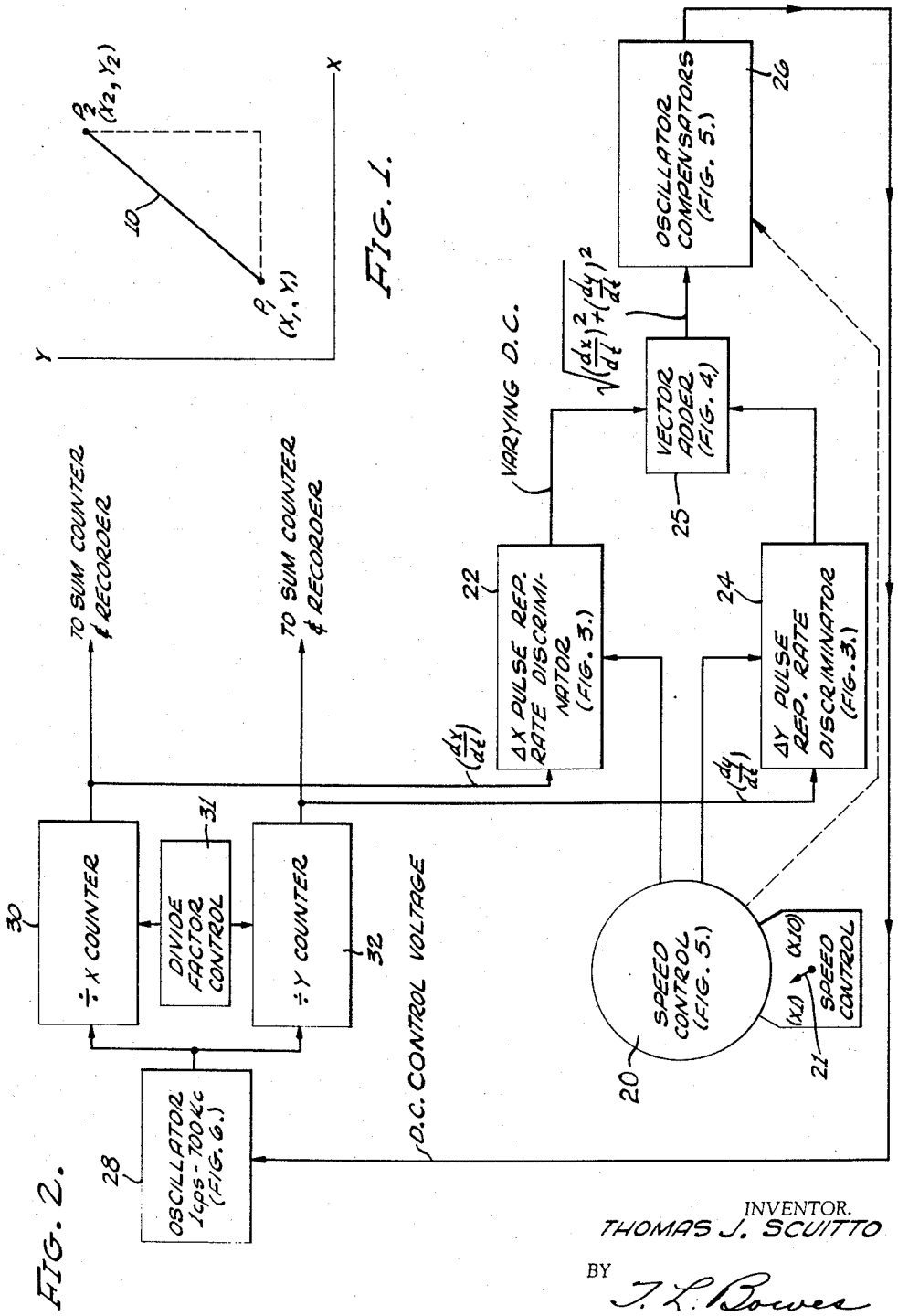
INVENTOR.
THOMAS J. SCUITTO
BY
ATTORNEY

FIG. 3.

United States Patent Office 2,927,735
Patented Mar. 8, 1960

2,927,735

FREQUENCY-CONTROL SYSTEM

Thomas J. Scuitto, Santa Monica, Calif., assignor to General Dynamics Corporation, Rochester, N.Y., a corporation of Delaware Application September 19, 1956, Serial No. 610,730

14 Claims. (Cl. 235—192)

This invention relates to control circuits and, more particularly, to a novel arrangement for controlling the frequency of an oscillator to provide a desired relationship in functions derived from the output of said oscillator.

In an application by Jack Rosenberg et al., for an Automation System, filed November 2, 1955, Serial No. 544,478, now Patent No. 2,833,941, and assigned to a common assignee, there is described and claimed an arrangement wherein control signals for directing the relative motion of a tool and workpiece to derive a desired cut on the workpiece may be generated from information on a drawing, and these control pulses may then be stored on a recording medium for subsequent utilization. These control signals are in the form of pulses, in response to each of which there is made to occur an increment of motion for an increment of distance along an axis. A train of pulses is recorded for the purpose of directing motion along one co-ordinate axis. Thus, assuming that the cutting tool is one used in a milling machine, then the workpiece is attached to a table and the table is moved so that the cutting tool, which is supported above the table, cuts or mills the desired path through the workpiece. For each different co-ordinate of motion, a different train of pulses is required. The desired cutting path is achieved by simultaneously applying the control pulses for each axis to direct motion along the various co-ordinate axes, whereby a resultant motion is obtained which defines the desired cutting path.

Not only do these control pulses determine the extent of motion along each co-ordinate, but the number of these control pulses within a given interval (for each co-ordinate) also determines the speed of motion along a co-ordinate axis, and thus the resultant speed of execution of the desired cut on the workpiece.

For the purpose of controlling the machine tool, for each co-ordinate axis, control pulses are fed from a source such as a recording medium to a reversible counter. The reversible counter provides a digital manifestation of its count, which is converted into an analog voltage form. This analog voltage, whose amplitude represents the count of the counter, is applied to a servomotor to drive the machine-tool table along the co-ordinate axis. A motion transducer senses the extent of the motion and provides an output consisting of a pulse for every increment of motion. The motion transducer output is applied to the reversible counter to be subtracted from the count which was entered therein by the command pulses.

The speed at which the table is driven is determined by the amplitude of the analog voltage. The amplitude of the analog voltage is determined by the size of the count in the reversible counter. Each control pulse causes one count in the counter. Since a definite amplitude analog voltage in response thereto is applied to drive the following apparatus at a preset speed, the higher the frequency of control pulses the larger the analog voltage and the greater the speed of the motor driven thereby. For a system wherein motion simultaneously occurs along two co-ordinate axes, if an increment of distance along one axis is represented by $\Delta x$ and the increment of distance along the second axis at right angles thereto is represented by $\Delta y$, then the speed at which motion occurs along the respective axes may be represented by $$\frac{dx}{dt} \text{ and } \frac{dy}{dt}$$

The resultant speed "S" may be represented by $$S = \sqrt{\left(\frac{dx}{dt}\right)^2 + \left(\frac{dy}{dt}\right)^2}$$

Good machine-shop practice demands that the speed at which a cutting operation is executed be kept substantially constant throughout the operation. This speed should be the one that is optimum for the type of material from which the cutting operation is being performed and which preserves the cutting tool.

In the previously mentioned application by Jack Rosenberg et al., it is shown how pulse trains representative of the incremental speed quantities $$\frac{dx}{dt} \text{ and } \frac{dy}{dt}$$

may be derived from a single clock-pulse oscillator. These pulse trains are used for ordering a machine tool to execute a desired cutting path. Since it is desired to maintain the speed along the path constant and since the control quantities are derived from the clock-pulse oscillator, in order to maintain the speed constant, it thus becomes necessary to vary the frequency of the clock-pulse oscillator so that the value of "S" in the expression for the resultant speed equals a constant.

An object of the present invention is the provision of a control system for controlling the frequency of an oscillator in response to functions derived from the oscillator output.

Another object of the present invention is the provision of a system for controlling the frequency of an oscillator so that the speed of operation of a machine tool in response to control pulses derived from said oscillator is maintained constant.

Yet another object of the present invention is the provision of a novel oscillator and control system therefor.

Another object of the present invention is the provision of novel circuitry for the derivation of an analog representation for speed along a path which is a resultant of motion along two rectangular co-ordinates.

Yet another object of the present invention is the provision of a novel, useful oscillator control system.

These and other objects of the invention are achieved by generating an analog representation of the resultant speed of the motion along a path which is obtained in response to two trains of pulses which direct motion along two separate coordinate paths. These two trains of pulses are derived from an oscillator. The frequency of this oscillator is continuously controlled by this analog quantity in a manner so that the analog quantity which is derived from the trains of pulses which, in turn, are derived from the oscillator is maintained substantially constant.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Fig. 1 is a drawing of a straight line on two co-ordinate axes shown for the purpose of assisting in an understanding of this invention;

Figure 2 is a block diagram of the invention;

Figure 3 is a circuit diagram of a pulse-repetition-rate discriminator employed in the embodiment of the invention;

Figure 4:
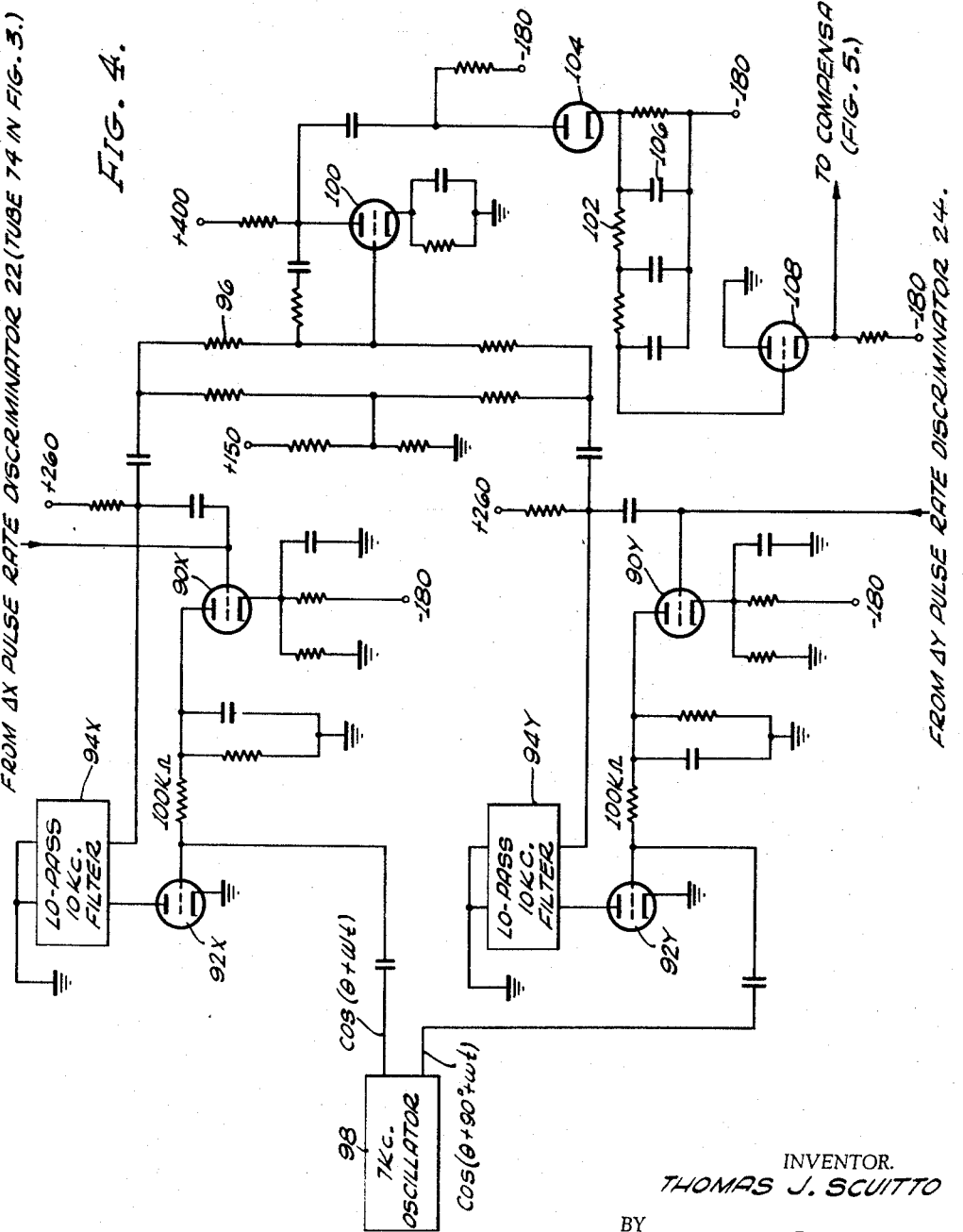
Figure 4 is a circuit diagram of an analog circuit for deriving the resultant speed from an input representing speed along two different coordinate axes.

In order to better understand the theory of operation of this invention, it is necessary to understand the theory of operation of the computer described and claimed in the above-noted application by Jack Rosenberg et al. If it is assumed that a straight-line path is desired between any two points in an $x$—$y$ plane, the equation $y=mx+b$ represents any straight line in this plane. If two points are given, one at the start of a desired linear path and the other at the end of a desired linear path, two pairs of values for $x$ and for $y$ may be derived which satisfy the equation and permit the constants $m$ and $b$ to be calculated.

Reference is now made to Figure 1, which shows a straight line 10 starting at point $p_1$ and ending at point $p_2$ in an $x$—$y$ plane. A machine tool, such as a milling machine, may be considered to have its table in the $x$—$y$ plane. Means are provided for driving a machine-tool table along the $x$ co-ordinate and along the $y$ co-ordinate. Thus, a simultaneous motion along both co-ordinates is required to make the resultant path of the table follow a straight line, such as that shown in Figure 1.

It can readily be shown that only a single line having the slope $m$ will pass through points $p_1$ and $p_2$. Thus, the information required to guide a machine tool to describe the straight line of the desired length as shown in Figure 1 is the value of the co-ordinates representing the beginning of the straight-line path, the slope of the straight line, and the value of the co-ordinates representing the end of the straight-line path. The slope of the straight line $m$ may be shown to be equal to the tangent of the angle $\theta$ made by the straight line and the $x$ axis. This is equal to $$\frac{y_2-y_1}{x_2-x_1}$$

From calculus, it can be shown that the slope of every incremental length of this straight line equals $$\frac{\Delta y}{\Delta x}$$

In the system being described, a pulse is derived for every increment of distance $\Delta x$ and another pulse is derived for every increment of distance $\Delta y$. Thus, the number of these $\Delta y$ and $\Delta x$ pulses required is the number of increments of distance required along the respective $x$ and $y$ axes to provide a resultant straight line of the desired length.

An electronic counter can be used to divide a number of input pulses by an integral quantity which can range from one up to the capacity of the counter, the integer depending on how the counter is set up. As a numerical example illustrating this, assume a pulse source having a frequency of 100 kilocycles is applied to drive a counter. To divide by five, for example, an output is taken from the counter each time it reaches its fifth count. The counter output will occur at the rate of 20 kilocycles. To divide by 10, an output is taken from the counter each time it reaches its tenth count. The output of the counter then occurs at a rate of 10 kc.

Now let it be assumed that a clock-pulse generator applies its output simultaneously to drive two counters. One of these counters, called a $\Delta x$ counter, is set to divide its input by a number equalling $\Delta x$. The other of these counters, called a $\Delta y$ counter, is set to divide its input by a number equalling $\Delta y$.

If both counters are supplied with pulses from a clock-pulse generator at a frequency $f$, then from the $\Delta x$ counter will emerge a train of pulses at one rate while from the $\Delta y$ counter will emerge a train of pulses at another rate for straight lines other than those with a slope at 45°. The output frequency of the $\Delta x$ counter will be equal to $$\frac{f}{\Delta x}$$

and the output frequency of the $\Delta y$ counter will equal $$\frac{f}{\Delta y}$$

If the ratio between these two output frequencies is considered, then it can be shown that $$\frac{\frac{f}{\Delta x}}{\frac{f}{\Delta y}}=\frac{\Delta y}{\Delta x}$$

which is exactly the slope of the line connecting points $p_1$ and $p_2$. Thus, to drive a machine-tool table which interprets each pulse as an order to move by an increment of distance along an axis, it is necessary to arrange for the $y$-axis drive to receive a number of pulses equalling $\Delta y$ and for the $x$-axis drive to receive a number of pulses equalling $\Delta x$. Furthermore, the totals of $\Delta x$ and $\Delta y$ pulses must occur over the same interval of time. The speed of motion of this drive can be shown to be that in the expression for speed, given previously above.

From the above description, it may be summarized that a clock-pulse generator provides pulses which are applied to two predetermined counters, one of which divides its input by the quantity $\Delta x$ and the other of which divides its input by the quantity $\Delta y$. For a straight line, the value of $\Delta x$ is established as $x_2-x_1$, the value of $\Delta y$ is established as $y_2-y_1$. As shown in the application by Rosenberg et al., this general attack may also be employed for deriving control-pulse trains for ordering simple and complex curves.

As was previously pointed out, the resultant speed with which a machine tool operates in response to the control pulses depends upon the frequency of these pulses and that depends upon the outputs from the divide counters which for a given dividing factor depends upon the frequency of the oscillator from which these control pulses are derived. Since the cuts being made on any workpiece may be considered as a succession of paths having different slopes, the dividing factors change. To maintain the machine-tool resultant speed constant with changes in the dividing factor, this invention is employed to alter the oscillator frequency to compensate for dividing factor changes.

Reference is now made to Figure 2, which is a block diagram of an embodiment of the invention and which, in accordance with this invention, shows an arrangement whereby the frequency of the clock-pulse oscillator may be controlled in a manner to maintain the speed of the machine tool to be controlled constant, regardless of the variations in the slope of the path being described. A speed-control knob 20 is employed to establish the setting of a number of potentiometers (shown in Figure 5), to establish a speed at which it is desired that the machine tool will subsequently operate. Some of these potentiometric settings control pulse-repetition-rate discriminators 22 and 24, respectively for the $x$ and $y$ co-ordinates. These set up a direct-current voltage level representative of the pulse repetition rate applied to their inputs. Others of these potentiometric settings are in circuits shown in Figure 5 and called oscillator compensator circuits 26. The compensator circuits serve the function of correcting the frequency response of the whole control loop to insure the stability of its output.

A switch 21 enables the speed setting for the embodiment of the invention being described to be established as one or ten times the potentiometer setting by the speed-control knob. Once a speed setting has been made, the apparatus is started and an oscillator 28, otherwise known as a clock-pulse oscillator, applies its output to a divide counter 30 for the $x$ co-ordinate axis and a divide counter 32 for the $y$ co-ordinate axis. The factor by which the oscillator output is divided is established by a divide factor control 31. This represents circuitry shown in the application by Rosenberg et al., which for a straight line, for example, enters a divide factor in the $x$-divide counter 30 of the difference between the values of the $y$ co-ordinates and the beginning and ending of the line, and enters a divide factor in the $y$-divide counter 32 of the difference between the values of the $x$ co-ordinates at the beginning and ending of the line. The output of these counters, in accordance with the description in the application by Jack Rosenberg et al. is applied to subsequent recording apparatus, not shown, as well as to subsequent summing counters, not shown, which can function to establish the quantities in the divide factor control by which the $\Delta x$ and $\Delta y$ divide counters divide, and to turn off the apparatus when the number of pulses counted by the respective summing counters equals the total number of distance increments required to describe the desired path. In accordance with this invention, the outputs from the respective $x$ and $y$ counters, representing $dx/dt$ and $dy/dt$, are also applied to pulse-repetition-rate discriminators 22 and 24. The function of these respective circuits is to convert the input pulses from the respective counters into direct-current voltages whose amplitudes vary to be representative of the pulse-repetition rate.

The output of the respective pulse-repetition-rate discriminators 22, 24 are applied to an analog circuit 25. This analog circuit serves the function of squaring the outputs from the pulse-repetition-rate discriminators, adding them, and then taking the square root of the sum. The output of the analog circuit 25 is applied to the compensator 26. This circuit functions as previously indicated to compensate frequency characteristics of the control loop to optimize its closed-loop response. The output of the compensator is a compensated direct-current voltage which is applied to control the frequency of oscillation of the clock-pulse oscillator 28.

From Figure 2 it may be seen that the outputs from the divide counters are converted by appropriate circuitry to an analog representation of the expression for speed, which is $$\sqrt{\left(\frac{dx}{dt}\right)^2+\left(\frac{dy}{dt}\right)^2}$$

When this analog representation departs from a value established by speed-control potentiometers, the oscillator changes frequency to effect the restoration to the preset value.

Figure 3:
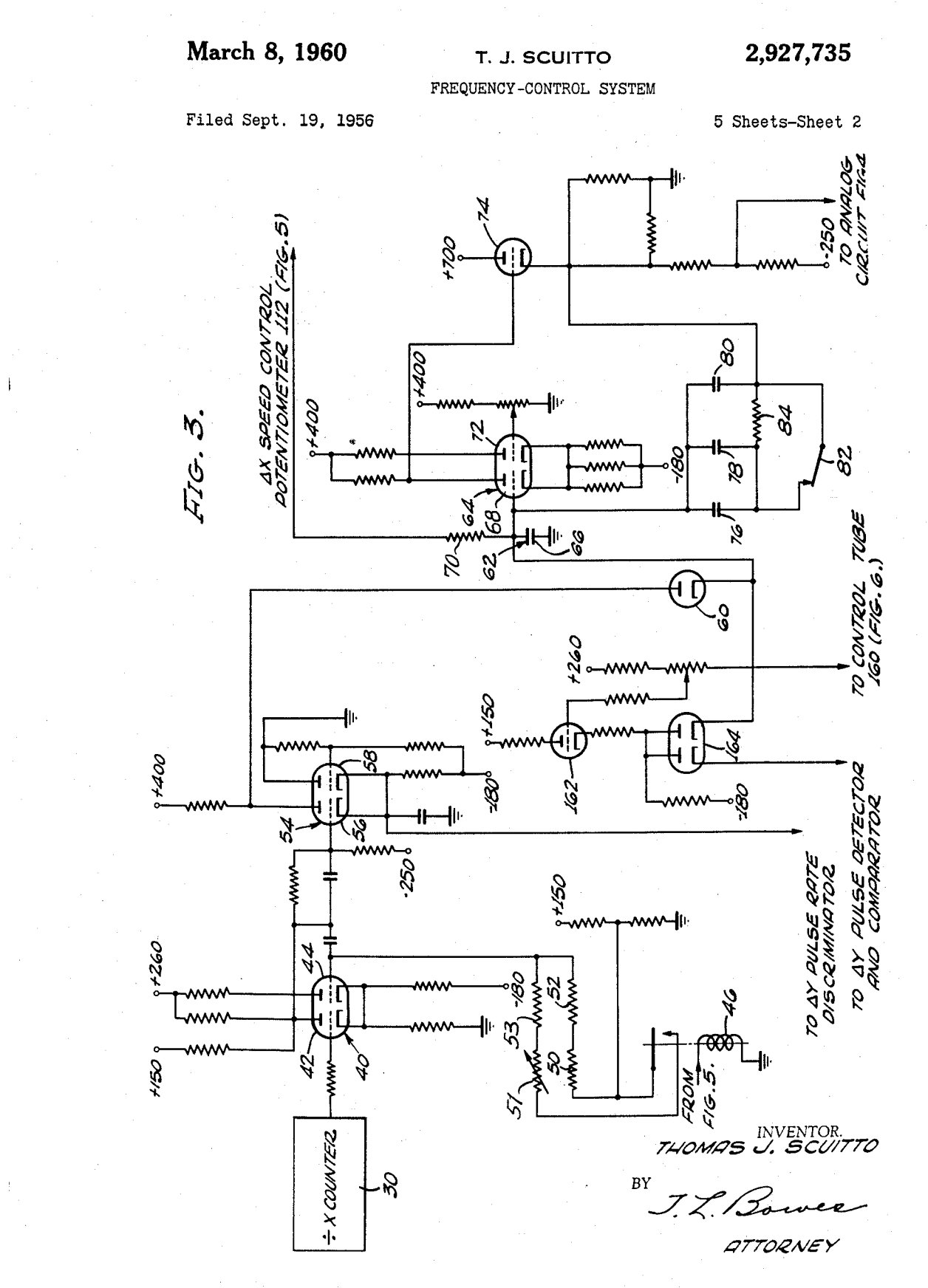

Figure 3 is a circuit diagram of the circuitry required for the pulse-repetition-rate discriminators 22 or 24 in Figure 2. The pulse-repetition-rate discriminators for the respective co-ordinate axes are identical; therefore, in the interests of preserving simplicity in the drawing and in the explanation, only one of these is shown. It is to be understood, however, that one pulse-repetition-rate discriminator shown in Figure 3 is required for each co-ordinate axis. In Figure 3, the output of the divide counter 30 is applied to the input grid of a one-shot multivibrator 40. As is well known, the one-shot multivibrator comprises two tubes 42, 44 having their cathodes coupled to a common-cathode load resistor and the anode of the tube 42, to the grid of which input pulses are applied, is coupled to the grid of the other tube 44. The arrangement is biased, so that one of the tubes 44 during standby is conducting and, upon the application of an input pulse, conduction is switched to the other tube 42 for a time, determined by the parameters of the circuit. Output is taken from the anode of the input tube 42.

Each output pulse from the divide counter 30 causes the multivibrator 40 to be driven from a stable to an unstable condition. The time during which the multivibrator remains in this unstable condition may be controlled by the value of the bias applied to the grid of the conducting one of the two tubes. In the embodiment of the invention which was built, it was desired that the period of instability, and thus the output pulse width for one case, is to be ten times the other. In effect, this operates to provide a multiplying action of either one or ten times the setting of the speed potentiometers shown in Figure 5, as will be explained subsequently herein. Selection as to which multiplier is to be effective is made by operating or not relay apparatus 46. Relay 46 is not operated when it is desired that a one-time speed multiplication occur. Relay 46 is operated from a switch shown in Figure 5 when it is desired that a ten-times speed multiplication should occur. When operated, the relay shunts the resistors 50, 52 with two others 51, 53, thus increasing the positive potential applied to the grid of the second tube 44 and thereby reducing the period of instability and the output pulse width by a factor of ten.

The output of the one-shot multivibrator is applied to a pulse-width amplifier 54, the function of which is to provide the proper current for the voltage pulse being applied thereto. The pulse-width amplifier here consists of two tubes 56, 58, the second of which 58 is cathode coupled to the first 56. The second tube 58 is merely used to establish the operating level for the first tube 56. Its control grid is coupled to a voltage divider connected between the anode which is at ground potential and a negative bias source. The bias applied to the pulse-width amplifier is such that the output is a standard-level pulse having the same width as the input.

The output of the pulse-width amplifier 54 is coupled through a diode 60 to a pulse detector network 62 and Miller integrator circuit 64. The pulse detector network includes a condenser 66 connecting the control grid of the first tube 68 of the Miller integrator to ground. A resistor 70 also connects this control grid through a potentiometer (shown in Figure 5) to ground. The Miller integrator consists of three tubes 68, 72, and 74, wherein tube 72 serves the function of setting the operating level for tube 68. This may be seen by noting that the cathodes of the two tubes 68 and 72 are coupled to common cathode load resistors and that the control grid of tube 72 is coupled to a fixed source of bias. The anode of tube 68 is coupled to the control grid of tube 74, which is a cathode-follower tube connected back to the control grid of tube 68 through three feedback condensers 76, 78, 80. The three condensers, when relay 46 is not operated, are connected in parallel. A normally closed contact 82 shunts out a resistor 84 at this time. When the relay is operated the resistor is inserted between condensers 78 and 80 and has the effect of decreasing the coupling capacitance, thereby reducing the feedback.

The pulse detector network 62 operates to establish an average D.C. level, representative of the rate of pulses being received, as well as of the width of these pulses. The effect of the Miller integrator circuit 64 is to assist in the smoothing of the average D.C. level established by the pulse detector network connected to its input.

The output of the Miller integrator is taken from the cathode of the cathode-follower tube 74 and is applied to the analog circuit 25 shown in Figure 4. It is to be understood that also applied to the analog circuit in Figure 4 is the output from the pulse-rate discriminator for the y co-ordinate. As previously pointed out, this is not shown since the circuitry is identical to that shown and described for Figure 3.

Referring now to Figure 4, the output of the pulse-repetition-rate discriminators 22 and 24 are respectively applied to the control grids of feedback amplifier tubes 90x and 90y. Both of these tubes serve the same function, namely, that of an automatic volume-control feedback amplifier. The anodes of these respective tubes 90x and 90y are coupled through resistors to the grids of respective controlled amplifiers 92x and 92y. The gain of these amplifiers is controlled in a manner to be described subsequently. The outputs of these controlled amplifier tubes are respectively applied to 10 kc. low-pass, band-pass filters 94x and 94y. The outputs from the 10 kc. filters 94x and 94y are respectively coupled back to the control grids of the feedback amplifiers 90x and 90y and are also connected to summing network 96.

A 7 kc. oscillator 98 provides two outputs at 7 kc., one of which is coupled to the grid of tube 92y and is 90° out of phase, or in quadrature, with the other output, which is coupled to the grid of tube 92y. It should be noted at this time that the manner of connection of the anodes of tubes 90x and 90y respectively through 100,000 ohm resistors to the grids of tubes 92x and 92y, and then by applying a negative bias to the cathodes of the tubes 90x and 90y enables these tubes to be used to control the gain of the tubes 92x and 92y. This result is achieved since the tubes 90x and 90y, in effect, act as variable impedances which increase in value as the signal applied to their control grids decreases and which decreases in value as the signal applied to their control grids increases. In the absence of signals from the pulse-repetition-rate discriminators the amount of 7 kc. fed back is enough to lower the impedance of tubes 90x and 90y so that tubes 92x and 92y are cut off. The signals from the pulse-repetition-rate discriminators oppose the 7 kc. signals. Thus, the amount of 7 kc. signal which is applied to the 10 kc. low-pass filter varies with the amplitude of the signal received from the pulse-repetition-rate discriminators 22 and 24. In effect, the 7 kc. signals are amplitude modulated in response to the signals from the pulse-rate discriminators.

The output of the 7 kc. oscillator consists of two waves in quadrature with each other. If one of these is $\cos(\theta + wt)$, the other is $\cos(\theta + 90° + wt)$. The obtention of two waves in quadrature with each other from a single oscillation source is well known in the art and may be done by the use of phase-shifting networks, for example. From trigonometry, it can be shown that the latter term i.e., $\cos(\theta + 90° + wt)$, is equivalent to the sine of $(\theta + wt)$. From trigonometry, it can also be shown that the resultant obtained by adding two wave shapes, one of which varies in accordance with the sine of $(\theta + wt)$ and whose amplitude is representative of $$\frac{dx}{dt}$$

and the other of which varies in accordance with the cos of $(\theta + wt)$ and whose amplitude is representative of $$\frac{dy}{dt}$$

produces a resultant sine wave whose amplitude may be expressed in rectangular co-ordinates as $$\sqrt{\left(\frac{dx}{dt}\right)^2 + \left(\frac{dy}{dt}\right)^2}$$

Since the amplitude of the wave shapes is modulated in accordance with the pulse-repetition rate by the feedback amplifiers 90x and 90y, then it should be seen that the values $$\frac{dx}{dt} \text{ and } \frac{dy}{dt}$$

in the expression are the values of $$\frac{dx}{dt} \text{ and } \frac{dy}{dt}$$

which have been obtained from the pulse-repetition-rate discriminators.

The output of the adder 96 is applied to an amplifier tube 100, the output from which is applied to a rectifying network 102, including a rectifier 104 and filter network 106. The effect of the rectifier and filter network is to develop a voltage proportional to the amplitude of the summed input sine wave and thus there is derived a voltage representative of the resultant speed at which a machine tool is driven as a result of motion along two co-ordinates at respective rates of $$\frac{dx}{dt} \text{ and } \frac{dy}{dt}$$

The output of the filter network is a D.C. voltage, the amplitude of which varies in accordance with the speed variations which are obtained. The output of the filter network is applied to a cathode-follower tube 108.

Figure 5:
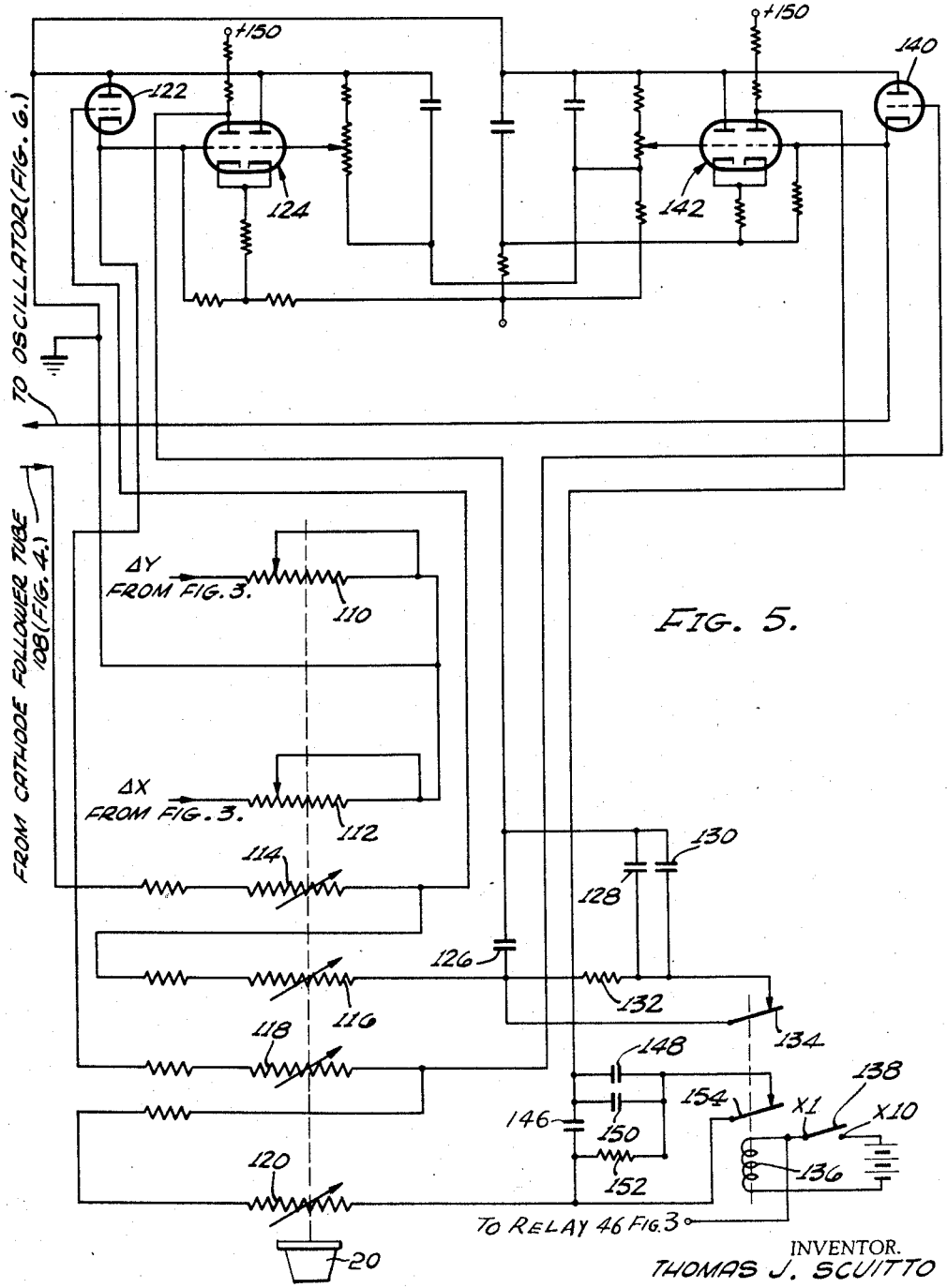
Figure 5 is a circuit diagram of the speed control and compensator circuits employed in the embodiment of this invention.

Reference is now made to Figure 5, which shows the speed-control arrangement for setting the speed at which it is desired that the machine tool operate. Also, an arrangement is shown for compensating the analog D.C. signal representative of speed for improving system transient response and stability. There are six potentiometers 110 through 120, which are ganged to be operated from a single speed control knob 20. Two of these, 110, 112, have one of their ends respectively coupled to the pulse-detector networks 62 (the one for potentiometer 112 being shown in Figure 3, the other not being shown). The other ends of these potentiometers 110, 112 are connected to ground. Variation of the resistance values of these potentiometers varies the time constant of the pulse-detector network 62, whereby the amplitude of the voltage modulating the 7 kc. frequencies in the subsequent analog circuit may be controlled by virtue of controlling the response of the pulse-detector network to the input pulse trains.

In the description of the block diagram, in Figure 2 it was pointed out that a D.C. voltage, which represents the speed at which the machine-tool apparatus will respond to the pulse trains, is used to control the frequency of the oscillator. By not applying the control voltage derived from the analog circuit to control the oscillator, but instead applying a synthetic control voltage to the oscillator which is connected into the entire system and measuring the system response, it was found that the system response as indicated by the analog circuit output, in certain regions, is more sensitive than is desired for the machine tool to be controlled. Accordingly, there is provided a network which attenuates the analog circuit output in the over-sensitive regions to thus assure a desired response by the system. The output from the cathode follower 108 in Figure 4 is applied to the potentiometer 114 in Figure 5, the other side of which is connected to a cathode-follower tube 122 and to one side of another potentiometer 116. The output of cathode-follower tube 122 is applied to an amplifier 124. This amplifier has two sections, the first of which is the amplifying section and the second is the bias-level-setting section. The output of the amplifying section is applied through three condensers 126, 128, 130 to the other side of the variable potentiometer 116. Two of the condensers 128, 130 have one of their ends coupled to the other end of the third condenser through a resistor 132. This resistor is shorted out by the normally closed contacts 134 of relay 136. Relay 136 is operated in parallel with relay 46 in Figure 3 by switch 138 when it is desired to multiply the speed established by the setting of the ganged potentiometers 110 through 120 by ten.

The cathode of the cathode-follower tube 122 is connected to one side of potentiometer 118. The other side of this potentiometer is connected to one side of potentiometer 120 and also to the control grid of a second cathode-follower tube 140. This second cathode-follower tube output is connected to a second amplifier 142, which is substantially similar to the amplifier 124. The output of the amplifier 142 is applied through three condensers 146, 148, 150, connected in parallel to the other side of the potentiometer 120. It should be noted that the arrangement of the condensers 146, 148, 150, the resistor 152, and the normally closed contacts 154 of relay 136 are identical to that described for condensers 126, 128, 130, resistor 132, and normally closed contacts 134. Therefore, when a multiplier operation is desired, relays 136 and 46 are operated whereby the value of the capacitance in the compensating network is reduced.

From the foregoing description, it should be apparent that the setting of the potentiometers 110 through 120 both determine the response of the pulse-director network 62 to the pulses being applied thereto and also the extent or amount of attenuation being applied to the speed-representative direct-current signal. Operation of the relays 136 and 46 reduce time constants in the one shot multivibrator circuit reducing pulse width by a factor of ten, in the Miller integrator feedback path, and in the compensating network.

The description that follows is that of the novel oscillator employed in the embodiment of the invention. The oscillator required is one wherein the output frequency can be varied in response to the amplitude of the D.C. voltage input over a suitable range. In the embodiment of the invention which was built, this range was from one cycle to 700 kc. The oscillator operates in accordance with the principles of operation of phase-shift oscillators, a description of which will be found in an article by E. L. Ginzton and L. M. Hollingsworth in the vol. XXIX, No. 2, February 1941 issue of the publication by the Institute of Radio Engineers, and entitled, Phase-Shift Oscillators. The phase-shift oscillator shown herein includes an oscillator tube with a phase-shift network coupled between the cathode and anode of the oscillator tube. The phase-shift, or phase-inverting, network has two sections, a low-frequency section and a high-frequency section, one of which takes over the operation from the other with a region of overlapping operation. As will be further explained, each section comprises capacitive series impedances and variable-shunt reactances.

Figure 6:
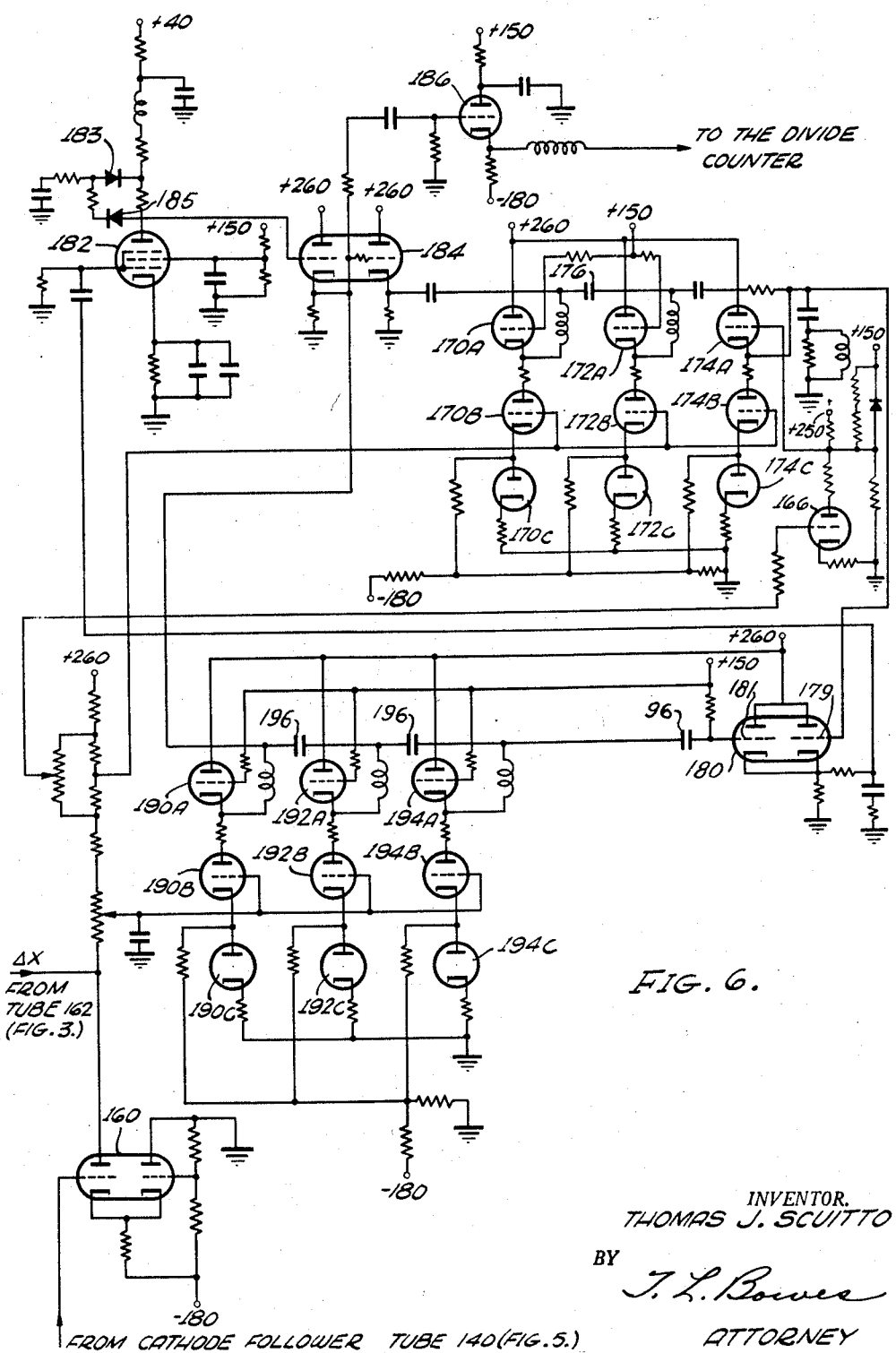
Figure 6 is a circuit diagram of the novel oscillator employed in the embodiment of the invention.

Reference is now made to Figure 6, which shows a circuit diagram of the oscillator employed. The output of the cathode follower 140 in Figure 5 is applied to a control tube 160 in Figure 6. This control tube 160 is a clamped amplifier which serves the function of amplifying the D.C. analog voltage after it has been compensated and applying it to the two sections of the oscillator, to a gate tube 166, and also feeding back a portion of the compensated D.C. analog voltage to a cathode-follower tube 162, shown in Figure 3, the output of which is applied to a double diode 164 to be fed back into the input to the x and y pulse-repetition-rate discriminator circuits. This feedback serves the purpose of adjusting the frequency of the oscillator to the correct value at the start of every path. It is inoperative during the generation of a path.

The portion of the output of the control tube 160 which is applied to a gate tube 166 enables the gate tube to block, or prevent, the further oscillation of the low-frequency section of the oscillator when the speed analog signal attains a value indicative of the fact that the frequencies desired are those to be derived only from the high-frequency portion of the oscillator. Considering first the low-frequency portion section of the oscillator, it will be seen that this comprises a series capacitance branch 176 and shunt sections coupled thereto. The three shunt sections 170, 172, 174 each has three tubes 170A,B,C, 172A,B,C, and 174A,B,C. In each section, the A and B tubes are triodes and the C tube is a diode. The three tubes in each section are connected in series. The direct-current control signal from control tube 160 is applied to the control grids of all the B tubes simultaneously. At spaced points along a delay line 176, connection is made to the cathodes of the three tubes 170A, 172A, 174A. The three diodes 170C, 172C, 174C connected to the cathodes of the respective tubes 170B, 172B, 174B limit the positive excursion of the cathodes. The shunt tubes and the series capacitance branch 176 comprise a phase-reversing network with each section being responsible for 60° phase shift. The frequency at which the 180° phase shift occurs and, therefore, the frequency of oscillation, is controlled by controlling the impedance of the tubes in the shunt sections by the signal being applied simultaneously to their grids. Oscillation will occur around the loop which includes the output cathode follower 180, to which output from both high and low phase-reversing sections is fed, an amplifier tube 182, driven by cathode follower 180 output, and a second double cathode follower tube 184, the output from which goes back to the high and low frequency phase-reversing networks. Output from the double cathode follower 184 is applied to an output cathode follower 186, the output from which is supplied to the divide counters. The amplifier tube 182 is the one which actually oscillates, the low and high frequency sections serving to provide 180° phase shift at a particular frequency, which is determined by the amplitude of the voltage being supplied from the control tube 80. Diode-limiting pair 183, 185 limit the amplitude of oscillations which is necessary in order to keep the shunt impedance tubes from becoming too nonlinear to operate properly.

The theory of operation of the high-frequency section is identical with that explained above for the low-frequency section. Its structure is substantially identical, consisting of series-connected capacitances 196 and shunt variable reactances 190, 192, 194. Each reactance has three tubes 190A, B, C, 192A, B, C, and 194A, B, C. The first of these have their cathodes coupled to the capacitances 196. The control voltage is simultaneously applied to the control grids of the second tubes 190B, 192B, 194B to establish their impedance values and thus determine the frequency of oscillation. Output of the high-frequency section is also applied to the cathode follower 180.

The oscillator has three distinct modes of operation: first, the low-frequency range, second, the transitional range, and third, the high-frequency range. In the low-frequency range, all the power applied to amplifier 182 comes from the low-frequency phase-shifting network. In the transitional range, the power is supplied by both high- and low-frequency phase-shifting networks. In the high range, the power is supplied entirely by the high-frequency phase-shifting networks.

In general, the amount of power supplied by both depends on the D.C. bias voltage applied to the respective low-frequency and high-frequency grids 179, 181 of cathode follower 180. It will be noted that the high-frequency grid-bias voltage is a fixed bias, whereas the low-frequency grid bias is obtained from the cathode of tube 174A. In the low-frequency mode of operation, tube 174A draws little current, and this bias is higher than the fixed bias on the high-frequency grid 181 of cathode follower 180. In view of the common-cathode load resistor of cathode follower tube 180, this effectively prevents all signal from the high-frequency phase-inverter section from passing through the high-frequency side of the cathode follower 180. As the frequency of the oscillator is raised, the low-frequency bias drops until it is equal to that of the high-frequency fixed bias. This brings the frequency into the transitional region, and both low- and high-frequency phase-inverting sections feed cathode follower 180, the output of which is fed into amplifier 182. Biasing on the phase-inverter networks must be such that they both give 180° phase shift for nearly the same frequencies over the short frequency range required for smooth transition. If the frequency is raised still further, the voltage on the low-frequency grid becomes less than that on the high-frequency grid of cathode follower 180, and thus output from the low-frequency section of the oscillator does not pass through the cathode follower 180, and the high-frequency network contributes most of the signal to amplifier 182.

However, as the frequency is increased further, the low-frequency signal derived from the phase-shift network greatly increases in amplitude, so that peaks of the low-frequency signal may be conducted by cathode follower 180 giving a harmful effect. Therefore, to correct this, a gate tube 166 is used to pull down the voltage on the grid of tube 174A, and thus the voltage on its cathode, thereby reducing the bias of the low-frequency grid 179 of cathode follower 180. This prevents these large peaks from being conducted. The gate tube operates in this manner in response to a portion of the analog signal derived from tube 169 only after a smooth transition has been effected by the normal bias variation of tube 174A, in response to increasing current through it as a result of the raising of the frequency of the oscillator. The point at which this occurs may be established by the proper biasing parameters applied to the gate tube 166. This position is selected as the one at which the interaction of the low- and high-frequency phase-inverting networks block, rather than assist, oscillation. The frequency of oscillation varies with the value of the voltage received from the control amplifier 160. As this voltage increases, the frequency increases and as this voltage decreases the frequency decreases. Since the control amplifier output is inversely related to the analog voltage being applied to its input, the oscillator frequency varies inversely with this analog voltage and thus inversely with speed changes. Therefore, as the divide counters alter resultant speed by reason of the factor of division being altered, the invention operates to change the frequency of the oscillator driving the divide counters so that the resultant speed remains constant, even though the factor of division is changed.

The apparatus that has been described performs the function of converting pulse trains which have been obtained from two dividing counters into an analog direct-current voltage which represents the speed at which apparatus to be controlled from the two pulse trains will operate in response to these pulse trains. This analog direct current is then corrected in order that the following oscillator, which is operated responsive to this analog signal, will provide a linear response. The oscillator output is then fed back into the dividing counter, to be divided down again.

The factor by which the divide counter divides is not always maintained constant. Thus, two straight lines following one another have different slopes, different dividing factors and are employed and thus the resultant pulse trains cause the subsequent machine-tool apparatus to be operated at different speeds for each straight-line path. This invention operates to prevent such different speeds. Furthermore, in the generation of pulse trains to command the cutting of circles, ellipses, or other complex curves, the divide factor which is set into the predetermined counter will vary continually, with consequent variation in the frequency of the pulse trains derived from the counters. The apparatus provided by the present invention controls the clock-pulse oscillator so that these variations in frequency of the output derived from the divide counter, are made to occur in a manner to maintain the speed of the apparatus controlled by the pulse trains substantially constant.

Accordingly, there has been shown and described herein a novel, useful arrangement for controlling the frequency of an oscillator in response to an analog voltage. A novel arrangement is shown for generating this analog voltage which is representative of the speed at which apparatus is driven in response to two pulse trains. The two pulse trains are derived from two divide counters which receive their input from the clock-pulse generator, which is controlled. Despite variations in the factor by which the divide counters divide, the clock-pulse generator frequency is altered responsive to this analog voltage to maintain the level of this analog voltage at a substantially constant value.

I claim:

1. In apparatus of the type wherein an oscillator has its output frequency divided by at least two counters to provide outputs consisting of two pulse trains from each of which there may be simultaneously produced a separate effect, means for maintaining a resultant of the separate effects substantially constant despite changes in the factors by which said two counters divide said oscillator output frequency comprising means to convert said two pulse trains to an analog voltage representative of the resultant of said separate effects, and means for varying said oscillator frequency responsive to said analog voltage to maintain said analog voltage substantially constant despite variations in the division of the output of said oscillator by said two counters.

2. In apparatus of the type wherein an oscillator has its output frequency divided by at least two counters to provide outputs consisting of two pulse trains from each of which there may be simultaneously produced a separate effect, means for maintaining a resultant of the separate effects substantially constant despite changes in the factors by which said two counters divide said oscillator output frequency comprising means to convert said two pulse trains to two direct-current voltages having levels representative of the frequency of said pulse trains, means to convert said two direct-current voltages to an analog voltage representative of the resultant of said separate effects, and means for varying said oscillator frequency responsive to said analog voltage to maintain said analog voltage substantially constant despite variations in the factors by which said two counters divide the output of said oscillator.

3. In apparatus of the type wherein an oscillator has its output frequency divided by at least two counters to provide outputs consisting of pulse trains from each of which there may be simultaneously produced a separate effect, means for maintaining a resultant of the separate effects substantially constant despite alteration of the factors by which said two counters divide said oscillator output frequency comprising for each pulse train circuit means to establish a voltage having an amplitude representative of the frequency of said pulse train, an adjustable means within each said circuit means to control the response of said circuit means to input thereto, analog means responsive to said two voltages representative of frequency to establish a voltage representative of the resultant of said separate effects, and means for controlling said oscillator to vary its frequency responsive to said resultant representative voltage to maintain said resultant representative voltage substantially constant despite variations of the division of the output of said oscillator by said two counters.

4. In apparatus as recited in claim 3 wherein said means to establish a voltage representative of the resultant includes means to establish two oscillations in quadrature with each other, means to modulate each of said oscillations with the output of a different one of said circuit means, means to add said modulated oscillations, and means to rectify the output of said means to add to produce as output said voltage representative of said resultant.

5. Apparatus as recited in claim 3 wherein each said circuit means to establish a voltage having an amplitude representative of the frequency of said pulse train includes means to standardize the pulse width and the pulse height of each pulse in said pulse train.

6. In apparatus as recited in claim 3 wherein said means for controlling said oscillator to vary its frequency responsive to said resultant representative voltage includes a low-frequency-feedback phase-shifting network and a high-frequency-feedback phase-shifting network in said oscillator, each said phase-shifting network including a plurality of capacitive impedances in series, a plurality of variable shunt impedances coupled to said capacitive series impedances, each said variable shunt impedances including a first tube, a second tube and a rectifier, said first and second tubes having anode, cathode and control grid electrodes, means coupling said first tube cathode to said second tube anode, means coupling said first tube cathode to said capacitive series impedances, means coupling said second tube anode to said rectifier, and means for applying said resultant representative voltage to said second tube control grid.

7. In apparatus of the type wherein an oscillator output frequency is controlled to maintain constant a function derived from the outputs of two divide counters which divide said oscillator output by factors which can differ, an improved oscillator comprising an oscillator tube having anode, cathode and control grid electrodes, a low-frequency phase-inverting network, a high-frequency phase-inverting network, means coupling each said network between the anode and control grid of said oscillator tube, each said phase-inverting network including a plurality of capacitive impedances in series and a plurality of variable shunt impedances, each variable shunt impedance including a first and second electron discharge tube and a rectifier, said first and second tubes having an anode, a cathode and a control grid electrode, first impedance means coupling said first tube cathode to said second tube anode, second impedance means coupling said second tube cathode to said rectifier, means coupling said first tube cathode to said plurality of capacitive impedances in series, and means to apply a voltage to the control grids of all said second tubes to control the frequency of oscillation.

8. An oscillator having its frequency established responsive to the amplitude of a control voltage comprising an oscillator tube having anode and control grid electrodes, a feedback phase-shift network coupled between the anode and control grid of said oscillator tube, said phase-shift network including a low-frequency section and a high-frequency section, each said section including at least three capacitors coupled in series and at least three shunt reactances, each said shunt reactance including a first and second tube each having an anode, cathode and control grid, means coupling the cathode of said first tube to the anode of said second tube, means coupling the cathode of said first tube to said three series capacitors, means to apply said control voltage to the control grid of said second tube, and means to block output from said low-frequency section when the frequency of oscillation exceeds a predetermined value.

9. An oscillator as recited in claim 8 wherein said means to prevent output from said low-frequency section when the frequency of oscillation exceeds a predetermined value includes a first and second cathode follower tube each having anode, cathode, and control grid electrodes, a common cathod load connected to the cathodes of said first and second cathode follower tubes, means to couple said oscillator tube control grid to said common cathode load, means to couple said low-frequency section to said first cathode follower tube control grid, means to couple said high-frequency section to said second cathode follower tube control grid, and means to cut off said first cathode follower tube when the frequency of oscillation exceeds a predetermined value.

10. An oscillator as recited in claim 9 wherein said means to cut off said first cathode follower tube includes a connection between said means to couple said low-frequency section to said first cathode follower control grid and the cathode of the first tube in one of its three shunt reactances, a gate tube having anode, cathode, and control grid electrodes means coupling said gate tube anode to the control grid of said first tube in said one of three shunt reactances, and means to apply said control voltage to said gate tube to reduce its anode voltage whereby the voltage on the control grid of said first cathode follower tube is reduced when the frequency of oscillation exceeds a predetermined value.

11. In apparatus of the type wherein an oscillator has its output frequency divided by at least two counters to provide outputs consisting of two pulse trains and where the factors by which said respective counters divide are subject to variation, means for each pulse train to establish a voltage having an amplitude representative of the pulse train frequency, means to establish two oscillations in quadrature with each other, a separate means to modulate each of said oscillations with a different one of said frequency-representative voltages, means to add said modulated oscillations, means to rectify and filter the output of said means to add to derive a resultant control voltage, and means to apply said resultant control voltage to said oscillator to vary its frequency to maintain the value of said resultant control voltage substantially constant.

12. In apparatus as recited in claim 11 wherein each said means for establishing a voltage having an amplitude representative of pulse-train frequency includes a means for establishing a pulse having a uniform width responsive to each pulse, means for establishing a pulse having a uniform amplitude responsive to output from said uniform pulse width establishing means, and a detecting network coupled to said uniform amplitude means output including a capacitor, a resistor connected in parallel therewith, and a smoothing network connected to said resistor and condenser.

13. In apparatus as recited in claim 11 wherein each said means to modulate includes a first and second electron discharge tube each having an anode, cathode, and control grid, means to apply one of said oscillations in quadrature to the control grid of said first tube, a filter tuned to pass the frequency of said oscillations, said filter having its input coupled to the anode of said first tube and its output coupled to said means to add and to the control grid of said second tube, means coupling said second tube anode to said first tube control grid, and means to apply one of said voltages having an amplitude representative of pulse-train frequency to the control grid of said second tube.

14. In apparatus as recited in claim 11 wherein said means to apply said resultant control voltage to vary said oscillator frequency includes means for compensating said resultant voltage for nonlinear response regions of said oscillator to said applied resultant voltage.

References Cited in the file of this patent

UNITED STATES PATENTS

| | | |
|---|---|---|
| 2,321,269 | Artz | June 8, 1943 |
| 2,386,892 | Hadfield | Oct. 16, 1945 |
| 2,581,594 | MacSorley | Jan. 8, 1952 |
| 2,627,055 | Calosi | Jan. 27, 1953 |
| 2,744,872 | Howson | Dec. 18, 1956 |
| 2,781,169 | Donan et al. | Feb. 12, 1957 |
| 2,820,898 | Familier et al. | Jan. 21, 1958 |

FOREIGN PATENTS

| | | |
|---|---|---|
| 571,840 | Great Britain | Sept. 11, 1945 |

OTHER REFERENCES

"A Numerically Controlled Milling Machine," May 31, 1953, Servomechanisms Laboratory, Massachusetts Institute of Technology, Cambridge 39, Massachusetts.